United States Patent
Yao et al.

(10) Patent No.: US 9,731,270 B2
(45) Date of Patent: *Aug. 15, 2017

(54) CONVERTING ETHANE TO LIQUID FUELS AND CHEMICALS

(71) Applicant: Phillips 66 Company, Houston, TX (US)

(72) Inventors: Jianhua Yao, Bartlesville, OK (US); Dhananjay Ghonasgi, Bartlesville, OK (US); Tushar Choudhary, Bartlesville, OK (US); Warren Ewert, Bartlesville, OK (US)

(73) Assignee: PHILLIPS 66 COMPANY, Houston, TX (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/571,803

(22) Filed: Dec. 16, 2014

(65) Prior Publication Data

US 2015/0175907 A1    Jun. 25, 2015

Related U.S. Application Data

(60) Provisional application No. 61/919,456, filed on Dec. 20, 2013, provisional application No. 61/919,465, filed on Dec. 20, 2013, provisional application No. 61/919,480, filed on Dec. 20, 2013, provisional application No. 61/919,493, filed on Dec. 20, 2013, provisional application No. 62/008,296, filed on Jun. 5, 2014, provisional application No. 62/008,303, filed on Jun. 5, 2014.

(51) Int. Cl.

| | |
|---|---|
| *C07C 45/00* | (2006.01) |
| *B01J 19/24* | (2006.01) |
| *C10G 57/02* | (2006.01) |
| *C10G 59/02* | (2006.01) |
| *C10G 63/02* | (2006.01) |
| *C10L 1/04* | (2006.01) |
| *C10G 50/00* | (2006.01) |
| *C10L 1/06* | (2006.01) |

(52) U.S. Cl.
CPC ............ *B01J 19/245* (2013.01); *C10G 50/00* (2013.01); *C10G 57/02* (2013.01); *C10G 59/02* (2013.01); *C10G 63/02* (2013.01); *C10L 1/04* (2013.01); *C10L 1/06* (2013.01); *B01J 2219/00051* (2013.01); *B01J 2219/24* (2013.01); *C10G 2300/1081* (2013.01); *C10L 2200/0423* (2013.01); *C10L 2200/0446* (2013.01); *C10L 2230/14* (2013.01); *C10L 2270/026* (2013.01)

(58) Field of Classification Search
CPC .... C07C 5/00; C07C 3/20; C07C 1/00; C10G 69/126; C10L 1/06; C10L 1/08
See application file for complete search history.

(56) References Cited

U.S. PATENT DOCUMENTS

| | | | | |
|---|---|---|---|---|
| 4,717,782 A | * | 1/1988 | Garwood | C07C 2/12 585/255 |
| 4,788,364 A | * | 11/1988 | Harandi | C07C 2/00 208/64 |
| 5,856,604 A | * | 1/1999 | Stine | C07C 5/3337 585/255 |
| 2009/0166258 A1 | * | 7/2009 | Haulle | B01D 53/002 208/100 |
| 2014/0114101 A1 | * | 4/2014 | Greene | C10G 45/58 585/254 |

* cited by examiner

Primary Examiner — Sharon Pregler
(74) Attorney, Agent, or Firm — Phillips 66 Company

(57) ABSTRACT

Converting ethane may include directing a gaseous stream from a gas well into a fractionator for fractionating and producing a post-fractionator ethane stream, which is directed into a thermal activation unit for heating and raising the temperature of the post-fractionator ethane stream thereby creating an activated ethane stream, which is directed into a quench tower thereby creating a quenched stream, which may be converted in a catalytic conversion unit to a mixed product stream containing hydrogen and $C_1$-$C_{15}$ hydrocarbons; directing the mixed product stream into a first separation unit forming a stream of $C_4$+ hydrocarbon product and a stream of $C_1$-$C_3$ hydrocarbons; directing the stream of $C_1$-$C_3$ hydrocarbons into a catalytic hydrogenation reactor thereby imparting hydrogen into a post-hydrogenation reactor stream, which is directed directly into a second separation unit thereby creating a light hydrocarbons recycle stream, which may be recycled into the thermal activation unit, and a hydrogen and methane stream.

20 Claims, 7 Drawing Sheets

CONVERTING ETHANE TO LIQUID FUELS AND CHEMICALS

CROSS-REFERENCE TO RELATED APPLICATIONS

This application is a non-provisional application which claims benefit under 35 USC §119(e) to U.S. Provisional Application Ser. No. 61/919,456 filed Dec. 20, 2013, entitled "CONVERTING ETHANE TO LIQUID FUELS AND CHEMICALS," and to U.S. Provisional Application Ser. No. 61/919,465 filed Dec. 20, 2013, entitled "CONVERTING ETHANE TO LIQUID FUELS AND CHEMICALS," and to U.S. Provisional Application Ser. No. 61/919,480 filed Dec. 20, 2013, entitled "CONVERTING ETHANE TO LIQUID FUELS AND CHEMICALS," and to U.S. Provisional Application Ser. No. 61/919,493 filed Dec. 20, 2013, entitled "CONVERTING ETHANE TO LIQUID FUELS AND CHEMICALS," and to U.S. Provisional Application Ser. No. 62/008,296 filed Jun. 5, 2014, entitled "ETHANE AND ETHANOL TO LIQUID TRANSPORTATION FUELS," and to U.S. Provisional Application Ser. No. 62/008,303 filed Jun. 5, 2013, entitled "SYSTEMS FOR CONVERTING ETHANE AND ETHANOL TO LIQUID TRANSPORTATION FUELS," all six of which are incorporated herein by reference in their entirety.

STATEMENT REGARDING FEDERALLY SPONSORED RESEARCH OR DEVELOPMENT

None.

FIELD OF THE INVENTION

This invention relates to the conversion of ethane to liquid fuels and chemicals.

BACKGROUND OF THE INVENTION

In recent years, an abundance of shale gas discoveries in the United States has resulted in a significant increase in natural gas production as well as natural gas liquid production. This increased level of production is expected to continue for the foreseeable future. One of the main components in the natural gas liquid is ethane, which has been predominantly used as feedstock for the petrochemical sectors. No other sizable consumption of ethane has been identified. What is needed then is a process of converting ethane to liquid hydrocarbon fuels.

BRIEF SUMMARY OF THE DISCLOSURE

The present teachings may include a process for converting ethane to liquid fuels comprising directing an ethane stream into an ethane cracking unit in a first stage to produce an intermediate hydrocarbon stream and a raw ethylene stream; contacting the raw ethylene stream with an oligomerization catalyst to produce a liquid hydrocarbon stream and an off-gas stream; introducing at least part of the off-gas stream into a hydrogenation reactor to remove unconverted olefins; yielding a mixture of a plurality of light paraffin components and a hydrogen component from the hydrogenation reactor; separating a hydrogen component and a plurality of light paraffin components in a post hydrogenation reactor separation unit using a PSA technology or membrane technology; and recycling the light paraffins stream into the ethane cracking unit. Processing may further include removing a hydrogen stream from the raw ethylene stream, recycling an off-gas recycle stream from an off-gas stream of the oligomerization unit separation unit to an inlet of the oligomerization reactor, utilizing solid phosphoric acid catalyst, zeolite catalyst, or Ni-containing catalyst within the oligomerization reactor.

In another example, a process for converting ethane to liquid fuels may include directing an ethane stream into an ethane cracking unit in a first stage to produce an intermediate hydrocarbon stream and a raw ethylene stream; removing a hydrogen stream from the raw ethylene stream; contacting the raw ethylene stream with an oligomerization catalyst to produce a liquid hydrocarbon stream and an off-gas stream; introducing at least part of the off-gas stream into a hydrogenation reactor to remove unconverted olefins; yielding a mixture of a plurality of light paraffin components and a hydrogen component from the hydrogenation reactor; separating a hydrogen component and a plurality of light paraffin components in a post hydrogenation reactor separation unit using a PSA technology or membrane technology; and recycling the light paraffins stream into the ethane cracking unit, recycling an off-gas recycle stream from an off-gas stream of the oligomerization unit separation unit to an inlet of the oligomerization reactor, utilizing solid phosphoric acid catalyst, zeolite catalyst, or Ni-containing catalyst within the oligomerization reactor.

In another example, a process for converting ethane to liquid fuels may include directing an ethane stream into an ethane cracking unit in a first stage to produce an intermediate hydrocarbon stream and a raw ethylene stream; fractionating the intermediate hydrocarbon stream into a gasoline fraction and a diesel fraction; removing a hydrogen stream from the raw ethylene stream; introducing the raw ethylene stream into a first oligomerization unit; contacting the raw ethylene stream with an oligomerization catalyst in the first oligomerization unit to produce a treated stream; introducing the treated stream to an oligomerization unit separation unit and producing a liquid hydrocarbon stream and an off-gas stream; recycling an off-gas recycle stream from an off-gas stream of the oligomerization unit separation unit to an inlet of the oligomerization reactor; introducing at least part of the off-gas stream into a hydrogenation reactor to remove unconverted olefins; yielding a mixture of a plurality of light paraffin components and a hydrogen component from the hydrogenation reactor; separating a hydrogen component and a plurality of light paraffin components in a post hydrogenation reactor separation unit using a PSA technology or membrane technology; and recycling the light paraffins stream into the ethane cracking unit. The process may also include utilizing solid phosphoric acid catalyst, zeolite catalyst, or Ni-containing catalyst within the oligomerization reactor. The process may also include providing a second oligomerization unit and regenerating a catalyst of the second oligomerization unit when the first oligomerization unit is treating the raw ethylene stream.

In another example, a process for converting ethane to liquid fuels may include directing a gaseous stream from a gas well into a fractionator; fractionating the gaseous stream to produce a post-fractionator ethane stream; directing the post-fractionator ethane stream directly into a thermal activation unit; heating and raising the temperature of the post-fractionator ethane stream within the thermal activation unit and creating an activated ethane stream; directing the activated ethane stream into a quench tower to create a quenched stream; directing the quenched stream into a conversion unit; utilizing a catalyst within the conversion unit to convert the quenched stream to a mixed product stream containing hydrogen and $C_1$-$C_3$ hydrocarbons; and directing the mixed product stream into a separation unit to form a stream of hydrogen and $C_1$-$C_3$ hydrocarbons. The process may also include recycling the stream of hydrogen and $C_1$-$C_3$ hydrocarbons into the fractionator, extracting $C_4$+ hydrocarbons from the quench tower, and extracting $C_4$-$C_{15}$ hydrocarbons from the separation unit. The step of heating and raising the temperature of the post-fractionator ethane stream within the thermal activation unit and creating an activated ethane stream, may further include producing an activated stream comprising hydrogen, methane, unconverted ethane, ethylene, acetylene, propane, propylene, acid gases, etc.

In another example, a process for converting ethane to liquid fuels may include directing an ethane stream from a gas well to a gas fractionator; producing a post-fractionator ethane stream from the gas fractionator; directing the post-fractionator ethane stream into a thermal activation unit; producing an activated stream from the thermal activation unit by heating the post-fractionator ethane stream in the thermal activation unit; directing the activated stream into a quench tower; producing in the quench tower, a first $C_4$+ hydrocarbon stream and a quenched stream; directing the quenched stream into a first separation unit; removing hydrogen in a hydrogen stream from the quenched stream in the first separation unit; directing the quenched stream without hydrogen, as a first separation unit exiting stream into a conversion unit; within the conversion unit, treating the first separation unit exiting stream with a catalyst and producing a converted product stream; and directing the converted product stream into a second separation unit and producing a second $C_4$+ hydrocarbon stream and a $C_3$+ and lighter hydrocarbon stream. The process may also include directing the $C_3$+ and lighter hydrocarbon stream back into the thermal activation unit. The activated stream may be a raw ethylene stream. The catalyst may be a metal-based catalyst. The catalyst may be a Nickel based catalyst. The catalyst may be Ni-ZSM-5 or otherwise Ni based.

In another example, a process for converting ethane to liquid fuels may include directing a gaseous stream from a gas well into a fractionator; fractionating the gaseous stream to produce a post-fractionator ethane stream; directing the post-fractionator ethane stream directly into a thermal activation unit; heating and raising the temperature of the post-fractionator ethane stream within the thermal activation unit and creating an activated ethane stream; directing the activated ethane stream into a quench tower to create a quenched stream; directing the quenched stream into a conversion unit; utilizing a catalyst within the conversion unit to convert the quenched stream to a mixed product stream containing hydrogen and $C_1$-$C_{15}$ hydrocarbons; and directing the mixed product stream into a first separation unit to form a stream of $C_4$+ hydrocarbon product and a stream of $C_1$-$C_3$ hydrocarbons. The process may also include directing the stream of $C_1$-$C_3$ hydrocarbons into a hydrogenation reactor containing a catalyst to impart hydrogen into a post-hydrogenation reactor stream; directing the post-hydrogenation reactor stream directly into a second separation unit and creating a light hydrocarbons recycle stream, and a hydrogen and methane stream; and recycling the light hydrocarbons recycle stream into the thermal activation unit.

In another example, a process for converting ethane may include directing a gaseous stream from a gas well into a fractionator; fractionating the gaseous stream to produce a post-fractionator ethane stream; directing the post-fractionator ethane stream directly into a thermal activation unit; heating and raising the temperature of the post-fractionator ethane stream within the thermal activation unit and creating an activated ethane stream; directing the activated ethane stream into a quench tower; discharging a first exiting quenched stream of $C_1$-$C_3$ hydrocarbons from the quench tower; discharging a second exiting quenched stream of $C_4$+ hydrocarbons from the quench tower; directing the first exiting quenched stream into a conversion unit; utilizing a catalyst within the conversion unit to convert the quenched stream to a mixed product stream containing hydrogen and $C_1$-$C_{15}$ hydrocarbons; and directing the mixed product stream into a separation unit; discharging a first exiting stream from the separation unit; discharging a second exiting stream from the separation unit; and directing the first exiting stream from the separation unit into an extraction and distillation unit. The first exiting stream from the separation unit may be a $C_4$+ hydrocarbon stream. The first exiting stream from the separation unit may be a first exiting $C_4$-$C_{15}$ hydrocarbon stream. The process may further include distilling and extracting a plurality of product streams from the first exiting $C_4$-$C_{15}$ hydrocarbon stream. One of the product streams may be benzene. One of the product streams may be toluene. One of the product streams may be xylene. The process may further include recycling the second exiting stream from the separation unit by directing it into the fractionator; recycling the second exiting stream from the separation unit by directing it into the thermal activation unit. The step of heating and raising the temperature of the post-fractionator ethane stream within the thermal activation unit and creating an activated ethane stream may further include producing an activated stream comprising hydrogen, methane, unconverted ethane, ethylene, acetylene, propane, propylene, and acid gases.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description and FIGS. 1-7, arrangements in accordance with the present teachings will be presented. It should be understood that the inventive features and concepts may be manifested in other arrangements and that the scope of the invention is not limited to the embodiments described or illustrated.

Figure 1:
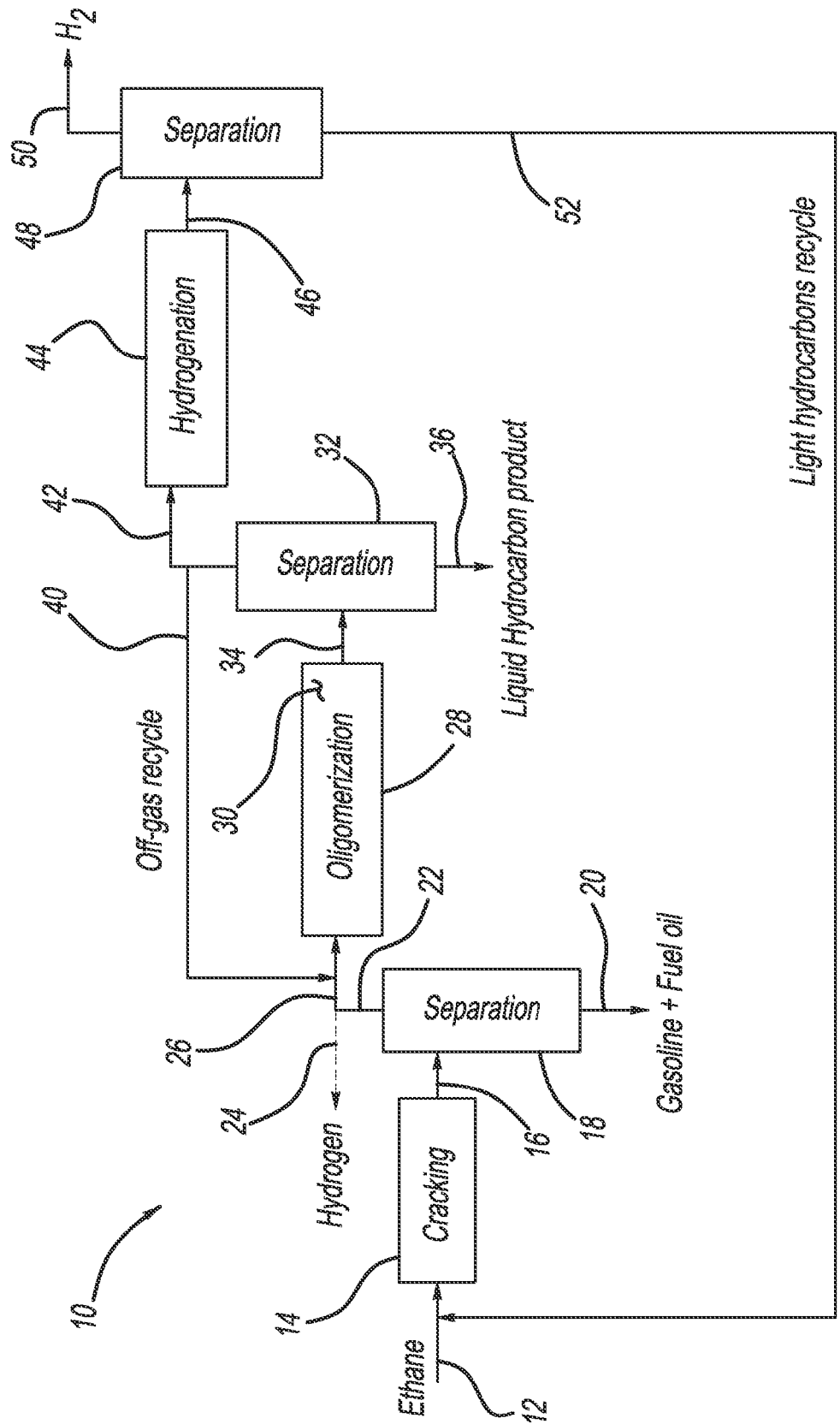
FIG. 1 is a schematic diagram depicting components used to convert ethane gas to liquid fuels.

FIG. 1 is a schematic diagram of an ethane conversion process 10 depicting components used to process ethane gas and convert it to liquid fuels. Ethane from an ethane stream 12 may be fed directly into a cracking unit 14. Upon exiting the cracking unit 14, a feed stream 16 is delivered directly into a separation unit 18, which produces a small pyrolysis gasoline/fuel oil stream 20 and a raw ethylene stream 22 consisting of hydrogen, methane, unconverted ethane, ethylene, acetylene, propane, propylene, acid gases, and other gaseous products. Optionally, hydrogen may need to be separated out of the raw ethylene stream 22 in a hydrogen stream 24, thus resulting in a feed stream 26 that possesses methane, unconverted ethane, ethylene, acetylene, propane, propylene, acid gases, and other gaseous products. Absent hydrogen, feed stream 26 is fed into an oligomerization reactor 28 containing an oligomerization catalyst 30. Feed stream 26 contacts the oligomerization catalyst 30 and two streams are formed upon the treated stream 34 exiting a separation unit 32; a liquid hydrocarbon stream 36 and an off-gas stream 38. Off-gas stream 38 is divided into an off-gas recycle stream 40 that may be re-directed or recycled back into and merged with feed stream 26, and a hydrogenation stream 42 that is directed directly into hydrogenation unit 44. Recycling the off-gas stream 38 as off-gas recycle stream 40 and directing it to an inlet of oligomerization reactor 28 may be required to improve ethylene conversion and to control the temperature of the oligomerizaiton reactor 28. The catalyst used for this oligomerization reaction can be solid phosphoric acid catalyst, zeolite catalyst, Ni-containing catalyst or any combination of such catalysts. Liquid hydrocarbon stream 36 may be further fractionated into a gasoline fraction and a diesel fraction as gasoline and diesel blending stocks, respectively. Hydrogenation stream 42 is introduced into a hydrogenation reactor 44 to remove unconverted olefins thereby yielding a light paraffin and hydrogen mixture stream 46. Light paraffin and hydrogen mixture stream 46 is then introduced into a separation unit 48, where a separation technology or method, such as pressure swing adsorption (PSA) technology or membrane technology to separate light paraffin and hydrogen mixture stream 46 into a hydrogen stream 50 and light hydrocarbons recycle stream 52. The light hydrocarbons stream 52 can be recycled back to the feed of the cracking unit 14.

There are numerous advantages to the ethane conversion process depicted in FIG. 1. FIG. 1 includes an ethane cracking stage to produce an intermediate hydrocarbon stream in a first stage that is subsequently converted to clean fuels, such as gasoline and diesel fuel, in a separate stage. Another advantage is that a significant portion of the gaseous product from the second stage is recycled back to the first cracking stage. More specifically, light hydrocarbons recycle stream 52 is recycled back to the ethane stream 12 that enters cracking unit 14, which is an ethane cracking unit. By directing light hydrocarbon recycle stream 52 back into cracking unit 14 as a recycle stream, a high efficiency of ethane conversion (e.g. greater than 80%) is ensured. Before light hydrocarbon recycle stream 52 is recycled and thereby becoming part of ethane stream 12 that enters cracking unit 14, it is first directed into and passes through a hydrogenation reactor unit 44 to eliminate any unreacted ethylene and other light olefins from the second stage, which includes an oligomerization unit 28 and subsequent separation unit 32. Because light hydrocarbon recycle stream 52 has passed through hydrogenation reactor unit 44 and subsequent separation unit 48, fouling of ethane cracking unit 14 and subsequent separation unit 18 is avoided. Also contributing to anti-fouling of components depicted in FIG. 1 and the overall efficiency of ethane conversion process 10 is the ethane concentration of ethane stream 12 that is directed into cracking unit 14. The ethane concentration of ethane stream 12 may be 70%, or slightly less than 70% or slightly more than 70%. Cracking of ethane stream 12 within ethane cracking unit 14 may be accomplished with catalytic cracking, non-catalytic cracking, oxy-steam cracking or some form of conventional steam cracking. In other words, the process depicted in and described in conjunction with FIG. 1, is not limited regarding ethane cracking methodology. Another advantage of ethane conversion process 10 is that the intermediate hydrocarbon stream that enters the second stage of ethane conversion process 10 may have a concentration of ethylene that varies from 30%-80% (inclusive), and may have a concentration of ethane that varies from 20%-60% (inclusive); all other hydrocarbons in the hydrocarbon stream of the second stage are less than 10%. Another advantage of ethane conversion process 10 is that it is not bound to any particular catalyst system. In other words, numerous catalyst options exist and may be utilized in the second stage of ethane conversion process 10. The second stage of ethane conversion process 10 is a reactor (i.e. oligomerization unit 28) that upgrades the intermediate product produced from the first cracking stage to produce clean fuels. This is a unique process in and of itself within ethane conversion process 10. Another potentially unique feature is that the first stage may be configured to not utilize regeneration (i.e. intermittent oxidative treatments to recover catalyst activity). The second stage may involve regeneration, depicted in FIG. 2.

Figure 2:
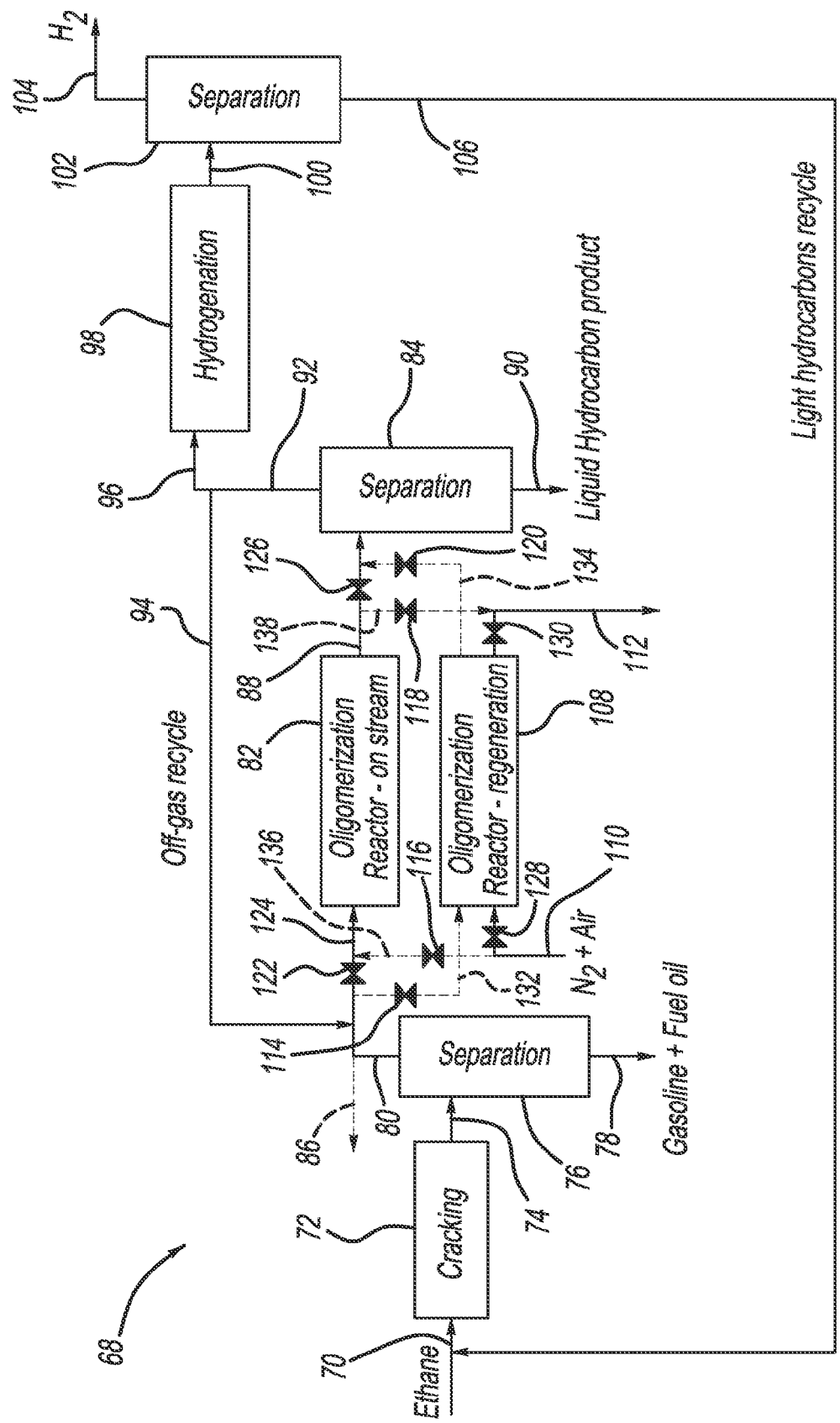
FIG. 2 is a schematic diagram depicting components used to convert ethane gas to liquid fuels, including regeneration.

FIG. 2 depicts ethane conversion process 68 including components used to convert ethane gas to liquid fuels, including catalyst regeneration for oligomerization. More specifically, Ethane from an ethane stream 70 may be fed directly into a cracking unit 72. Upon exiting the cracking unit 72, a feed stream 74 is delivered directly into a separation unit 76, which produces a small pyrolysis gasoline/fuel oil stream 78 and a raw ethylene stream 80 consisting of hydrogen, methane, unconverted ethane, ethylene, acetylene, propane, propylene, acid gases, and other gaseous products. Optionally, hydrogen may be separated out of the raw ethylene stream 80 in a hydrogen stream 86, thus resulting in a feed stream 80 that possesses methane, unconverted ethane, ethylene, acetylene, propane, propylene, acid gases, and other gaseous products. Feed stream 80 is next fed into an oligomerization reactor (on stream) 82 containing an oligomerization catalyst. Feed stream 80 contacts the oligomerization catalyst within oligomerization reactor (on stream) 82, exits as a treated stream 88, which then enters a separation unit 84. Separation unit 84 is configured such that two exit streams are formed upon the treated stream 88 exiting separation unit 84. One stream is a liquid hydrocarbon stream 90 and an off-gas stream 92. Off-gas stream 92 may be divided into an off-gas recycle stream 94 that may be re-directed or recycled back into and merged with feed stream 80, and a hydrogenation stream 96 that is directed directly into hydrogenation unit 98. Recycling the off-gas stream 92 as off-gas recycle stream 94 and directing it to an inlet of oligomerization reactor 82 may be required to improve ethylene conversion and provide reactor temperature control. The catalyst used for oligomerization reactions can be solid phosphoric acid catalyst, zeolite catalyst, Ni-containing catalyst or any combination of such catalysts. Liquid hydrocarbon stream 90 may be further fractionated into a gasoline fraction and a diesel fraction as gasoline and diesel blending stocks, respectively. Hydrogenation stream 96 is introduced into a hydrogenation reactor 98 to remove unconverted olefins thereby yielding a light paraffin and hydrogen mixture stream 100. Light paraffin and hydrogen mixture stream 100 is then introduced into a separation unit 102, where a separation technology or method, such as pressure swing adsorption (PSA) technology or membrane technology to separate light paraffin and hydrogen mixture stream 100 into a hydrogen stream 104 and light hydrocarbons recycle stream 106. An oligomerization reactor (regeneration) 108 may be included, as depicted in FIG. 2.

Oligomerization reactor (regeneration) 108 is included as a component in the system of FIG. 2 for the benefit that while one oligomerization reactor is in operation, another may be regenerating to recover the catalyst activity within the reactor. As depicted in FIG. 2, Oligomerization reactor (on stream) 82 may be operating, as described above, while oligomerization reactor (regenerating) 108 may be regenerating. Oligomerization reactor (on stream) 82 and oligomerization reactor (regenerating) 108 may switch back and forth in their functions (on stream operation vs. regeneration), as depicted using the dashed lines in FIG. 2, and may be known as a swing unit. More specifically, as depicted in FIG. 2, when oligomerization reactor (on stream) 82 is operating within ethane conversion process 68, oligomerization reactor (regenerating) 108 is in a regeneration mode. When in regeneration mode, oligomerization reactor (regenerating) 108 is not in any fluid communication with ethylene feed stream 80. This means that Nitrogen ($N_2$) and air line 110 directs Nitrogen (N2) and air directly into oligomerization reactor (regenerating) 108 to facilitate regeneration of the catalyst being employed within oligomerization reactor (regenerating) 108. Discharge line 112 takes away or removes any byproducts of the regeneration of the catalyst within oligomerization reactor (regenerating) 108 during regeneration, and valves 114, 116, 118, and 120 are closed during regeneration to prevent interference with the operation of oligomerization reactor (on stream) 82.

When regeneration of oligomerization reactor (regenerating) 108 is complete and ready to be put back on-line or on-stream, and oligomerization reactor (on stream) 82 is ready to be taken off-line or off-stream for regeneration, valves 114 and 120 are opened to permit ethylene feed stream 80 to access oligomerization reactor 108 to permit ethane to liquid fuels process 68 to continue, and valves 122, 126, 128, and 130 are closed, and valves 116 and 118 are opened to only permit the flow of Nitrogen (N2) and air into oligomerization reactor 82, and not into any other lines or oligomerization reactor 108. With such a swing or alternating operation of oligomerization reactors 82, 108, continuous or near continuous operation of ethane to liquid fuels process 68 is possible. Valve 114 controls access to ethylene line 132, valve 120 controls access through treated ethylene line 134. Valve 116 controls access of Nitrogen (N2) and air in Nitrogen (N2) and air line 136. Valve 118 control access to discharge line 112 for oligomerization reactor 82.

There are numerous advantages to the ethane conversion processes depicted in FIGS. 1 and 2. FIGS. 1 and 2 include an ethane cracking stage to produce an intermediate hydrocarbon stream in a first stage that is subsequently converted to clean fuels, such as gasoline and diesel fuel, in a separate stage. Another advantage is that a significant portion of the gaseous product from the second stage is recycled back to the first cracking stage. More specifically, as depicted in FIG. 1, light hydrocarbons recycle stream 52 is recycled back to the ethane stream 12 that enters cracking unit 14, which is an ethane cracking unit. By directing light hydrocarbon recycle stream 52 back into cracking unit 14 as a recycle stream, a high efficiency of ethane conversion (e.g. greater than 80%) is ensured. Before light hydrocarbon recycle stream 52 is recycled and thereby becoming part of ethane stream 12 that enters cracking unit 14, it is first directed into and passes through a hydrogenation reactor unit 44 to eliminate any unreacted ethylene and other light olefins from the second stage, which includes an oligomerization unit 28 and subsequent separation unit 32. Because light hydrocarbon recycle stream 52 has passed through hydrogenation reactor unit 44 and subsequent separation unit 48, fouling of ethane cracking unit 14 and subsequent separation unit 18 is avoided. Also contributing to anti-fouling of components depicted in FIG. 1 and the overall efficiency of ethane conversion process 10 is the ethane concentration of ethane stream 12 that is directed into cracking unit 14. The ethane concentration of ethane stream 12 may be 70%, or slightly less than 70% or slightly more than 70%. Cracking of ethane stream 12 within ethane cracking unit 14 may be accomplished with catalytic cracking, non-catalytic cracking, oxy-steam cracking or some form of conventional steam cracking. In other words, the process depicted in and described in conjunction with FIG. 1, is not limited regarding ethane cracking methodology. With continued reference to FIG. 1, another advantage of ethane conversion process 10 is that the intermediate hydrocarbon stream that enters the second stage of ethane conversion process 10 may have a concentration of ethylene that varies from 30%-80% (inclusive), and may have a concentration of ethane that varies from 20%-60% (inclusive); all other hydrocarbons in the hydrocarbon stream of the second stage are less than 10%. Another advantage of ethane conversion process 10 is that it is not bound to any particular catalyst system. In other words, numerous catalyst options exist and may be utilized in the second stage of ethane conversion process 10. The second stage of ethane conversion process 10 is a reactor (i.e. oligomerization unit 28) that upgrades the intermediate product produced from the first cracking stage to produce clean fuels. This is a unique process in and of itself within ethane conversion process 10. Although advantages have been discussed using FIG. 1, the same advantages are evident with the process depicted in FIG. 2, which has the added advantage of simultaneously conducting oligomerization in one unit, while regenerating the catalyst of an off-line oligomerization unit.

Figure 3:
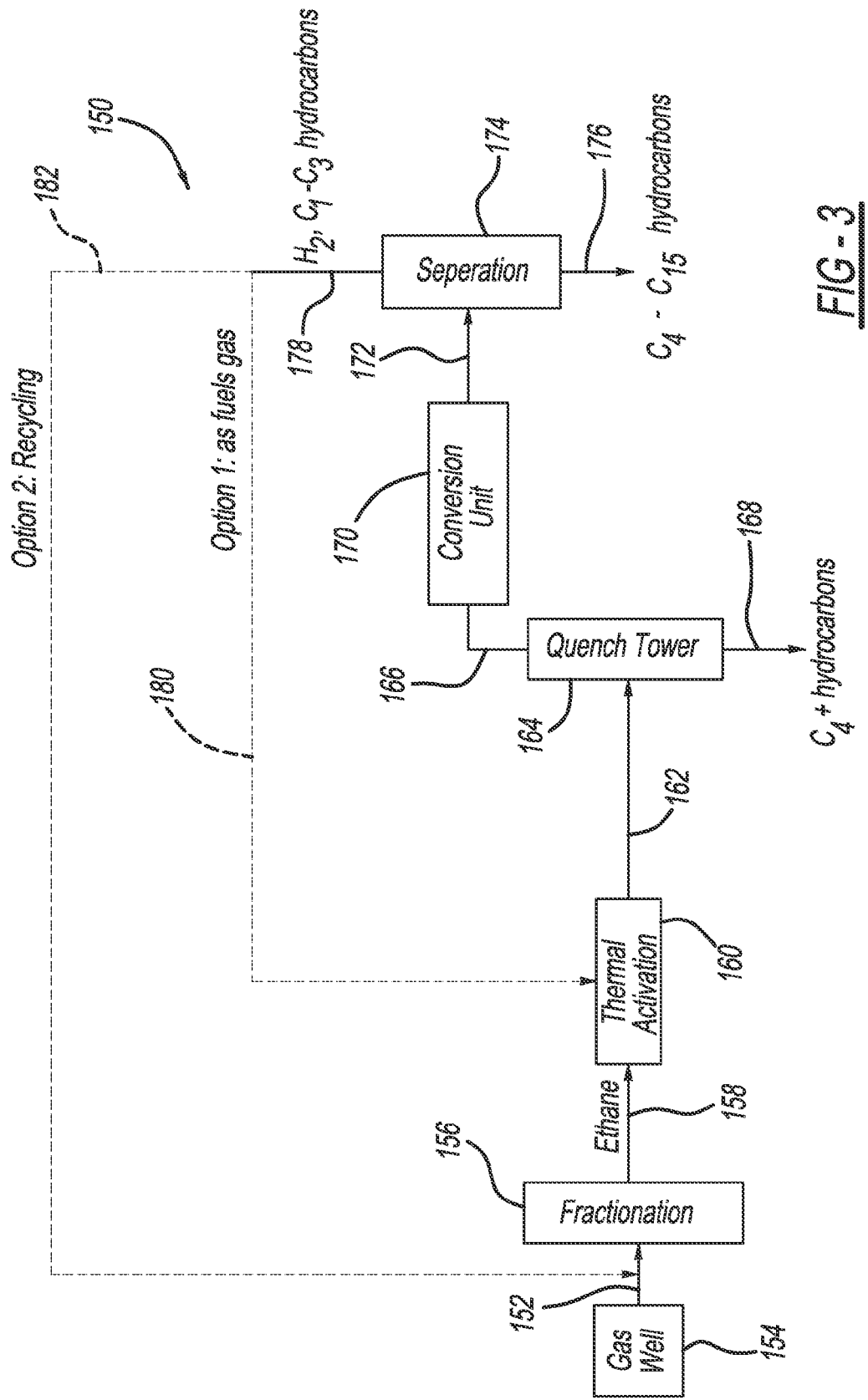
FIG. 3 is a schematic diagram depicting components used to convert ethane gas to liquid fuels.

Turning to FIG. 3, a schematic diagram depicts components used in a process to convert ethane gas to liquid fuels 150. More specifically, an ethane stream 152 from a gas well 154, for example, may be directed directly from gas well 154 into a fractionator 156 for fractionation. Upon undergoing fractionation in fractionator 156, a post-fractionator ethane stream 158 directly enters thermal activation unit 160 where heat is added. More specifically, ethane in post-fractionator ethane stream 158 is activated at the temperature of 500 degrees Celsius to 1000 degrees Celsius to produce an activated stream 162 exiting thermal activation unit 160 consisting of hydrogen, methane, unconverted ethane, ethylene, acetylene, propane, propylene, acid gases, and other products. Activated stream 162 is directed directly from thermal activation unit 160 into a quench tower 164 to quench the activated stream. A hydrocarbon stream 168 may exit quench tower 164 and be a stream of $C_4+$ hydrocarbons. Also exiting quench tower 164 is a quenched stream 166 that is directed directly into a conversion unit 170 where a catalyst, such as zeolite (e.g. ZSM-5 zeolite), converts activated, quenched stream 166 to a mixed product stream 172 that exits conversion unit 170 and contains $C_1$-$C_{15}$ hydrocarbons and hydrogen. Mixed product stream 172 is directed directly into a separation unit 174 where it is separated into two streams, a $C_4$-$C_{15}$ hydrocarbon stream 176 to be used as gasoline and diesel fuels, and a hydrogen ($H_2$) and $C_1$-$C_3$ hydrocarbon stream 178, which is also known as a light hydrocarbon stream.

There are two utilization options for this light hydrocarbon stream 178. A first flow option is depicted with flow path 180 which is for hydrogen (H$_2$) and C$_1$-C$_3$ hydrocarbons stream 178 being used as a fuel gas in the ethane thermal activation unit 160. In other words, as flow path 180 in FIG. 3 depicts, hydrogen (H$_2$) and C$_1$-C$_3$ hydrocarbons stream 178 is directed directly back into thermal activation unit 160. A second flow option is depicted with flow path 182 which is for hydrogen (H$_2$) and C$_1$-C$_3$ hydrocarbons stream 178 being used as a recycling stream and a feed for the fractionator 156 since flow path 182 connects to ethane stream 158 just before fractionator 156.

Table 1 below depicts conversion unit performance for catalyst ZSM-5 under the following conditions: 310 degrees Celsius, 50 psig, 1.0 hr$^{-1}$ (Ethylene WHSV), H$_2$/N$_2$/Ethylene/H$_2$O.

TABLE 1

| Conversion Unit Performance | |
|---|---|
| Catalyst | ZSM-5 |
| Pressure, psig | 50 |
| Temperature, Degrees Celsius | 310 |
| Ethylene conversion, % | 98 |
| HC product selectivity, wt % | |
| Methane | 0.1 |
| Ethane | 0.8 |
| Propane | 2.1 |
| Propylene | 1.9 |
| Butanes | 9.3 |
| Butenes | 5.5 |
| C5+ | 80.2 |
| Total, % | 100.00 |

Table 1 shows that ZSM-5 catalyst is able to convert a raw ethylene stream to a hydrocarbons stream with liquid hydrocarbons (C5+) selectivity of ~80 wt %.

Figure 4:
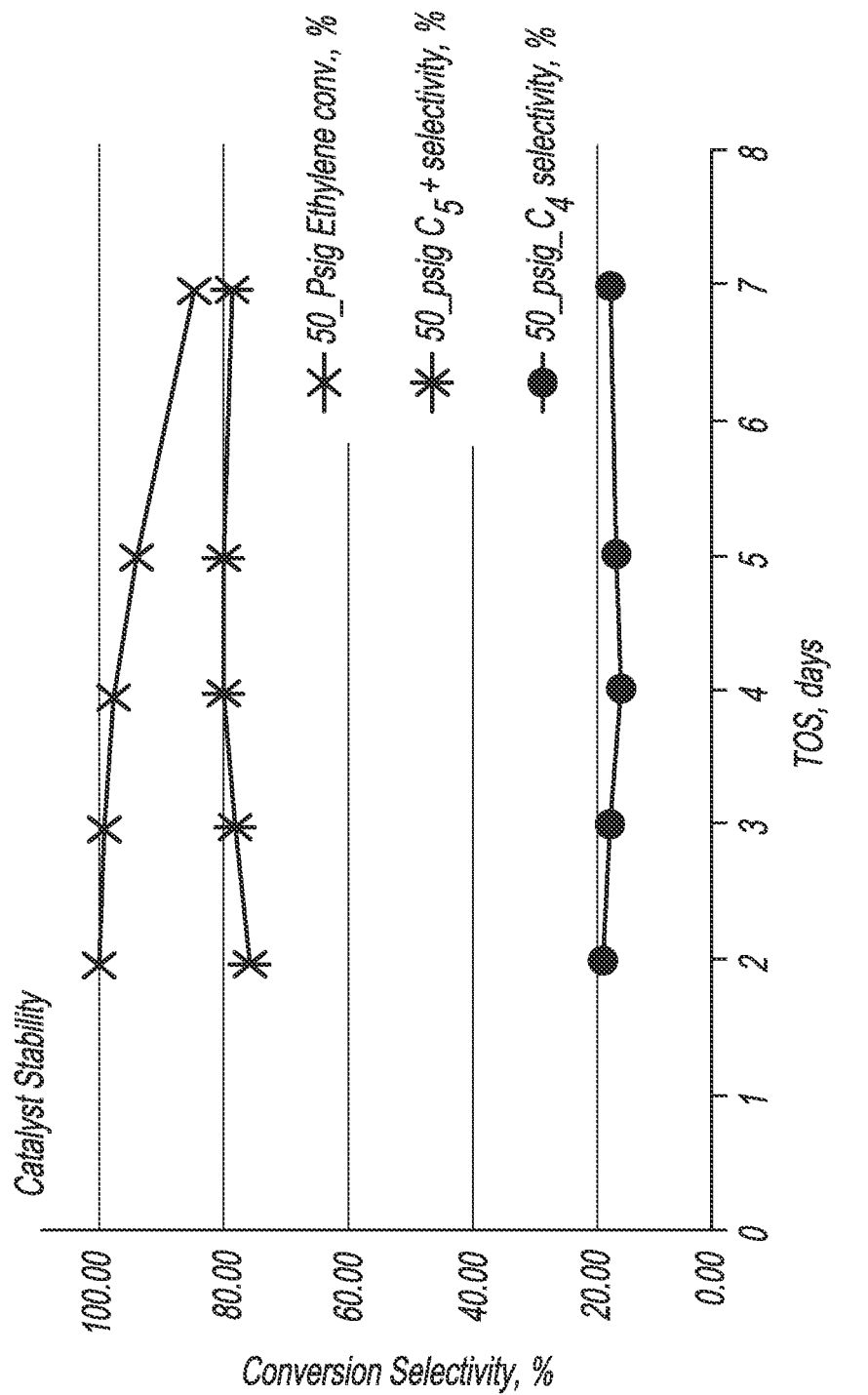
FIG. 4 is a graph depicting conversion selectivity percentage versus TOS in days.

FIG. 4 is a graph depicting conversion selectivity percentage versus time on stream (TOS) in days. FIG. 4 shows the catalyst stability over 7 days on stream operation.

Table 2 below depicts liquid product quality in a DHA analysis for a liquid sample collected on the second day of on stream operation.

TABLE 2

| Liquid Product Quality | |
|---|---|
| GROUP | Wt % |
| Paraffin | 5.9 |
| I-Paraffins | 24.3 |
| Aromatics | 44.5 |
| Naphthenes | 10.1 |
| Olefins | 7.9 |
| Unidentified | 5.9 |
| C15 Plus | 1.4 |
| Total | 100.0 |
| Calculated RON | 97.5 |
| Calculated MON | 80.1 |
| RVP (psi) | 4.6 |

Table 2 shows that the liquid hydrocarbon product is a viable gasoline blending stock.

Figure 5:
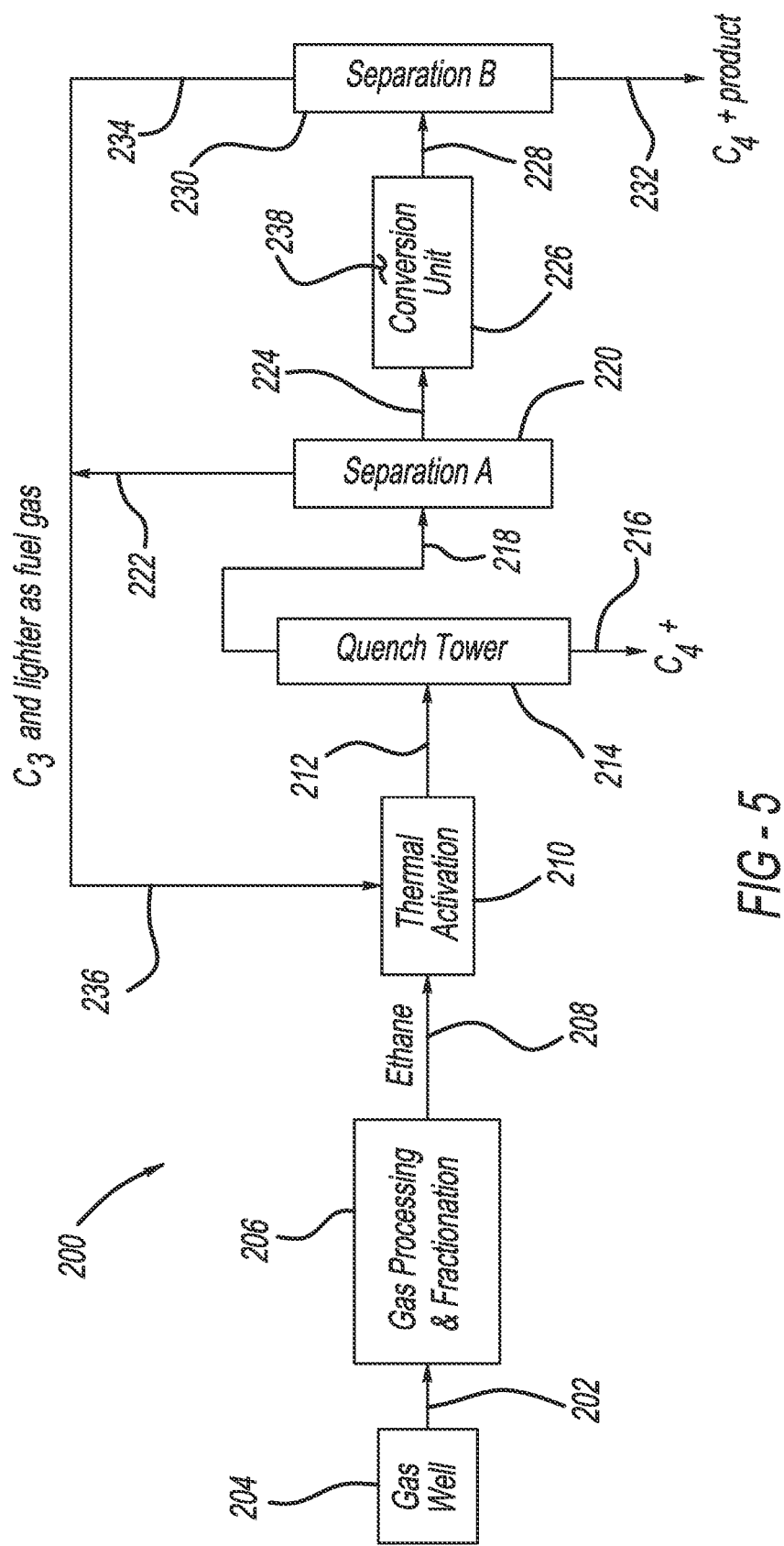
FIG. 5 is a schematic diagram depicting components used to convert ethane gas to liquid fuels.

Turning now to FIG. 5, a schematic diagram depicts components used in a process to convert ethane gas to liquid fuels 200. More specifically, an ethane stream 202 from a gas well 204, for example, may be directed directly from gas well 204 into a fractionator 206 for fractionation and associated gas processing. Upon undergoing fractionation in fractionator 206, a post-fractionator ethane stream 208 directly enters thermal activation unit 210 where heat is added to make the temperature of the ethane 500 degrees Celsius to 1000 degrees Celsius (inclusive). More specifically, ethane in post-fractionator ethane stream 208 is activated by heating to the temperature range of 500 degrees Celsius to 1000 degrees Celsius to produce an activated stream 212 that exits thermal activation unit 210 and consists of hydrogen, methane, unconverted ethane, ethylene, acetylene, propane, propylene, acid gases, and other products. Activated stream may be a raw ethylene stream.

Activated stream 212 is directed directly from thermal activation unit 210 into a quench tower 214 to quench the activated stream 212. A hydrocarbon stream may exit quench tower 214 and be a C$_4$+ hydrocarbon stream 216. Also exiting quench tower 214 is a quenched stream 218 that is directed directly into a first separation unit 220. Within first separation unit 220, quenched stream is separated into a hydrogen (H2) stream 222 and another first separation unit exiting stream 224. First separation unit exiting stream 224 is directed directly into conversion unit 226 where Oligomerization reactions occur to produce a C$_{1-15}$ stream using a Ni based catalyst, as an example. From conversion unit 226, a converted product stream 228 that exits conversion unit 226 is directed directly into a second separation unit 230 where it is separated into two streams, a C$_4$+ hydrocarbon stream 232, which may be used as gasoline and/or diesel fuel, and a C$_3$ and lighter product stream 234 into which hydrogen stream 222 is blended to form a hydrogen and C$_3$ and lighter product stream 236 which is then used as fuel in the thermal activation unit 210. Optionally, to improve the efficiency of the process, the C$_3$ and lighter product stream 234 (without blending with hydrogen 222) can be recycled to the activation reactor by combining the C3 and lighter product stream 234 with ethane stream 208.

There are multiple advantages of the process to convert ethane gas to liquid fuels 200. In one advantageous step, thermal activation of ethane in thermal activation unit 210 produces a raw ethylene stream simply and easily. Another advantage is using raw ethylene in a conversion unit to produce liquid fuels such as gasoline and diesel fuel because using raw ethylene results in lowering the costs of separating impurities from ethylene. Yet another advantage of process 200 is the option to remove hydrogen in a hydrogen stream 222 from the first separation unit 220. Hydrogen is a byproduct of thermal activation in thermal activation unit 210. By removing hydrogen in hydrogen stream 222 before first separation unit exiting stream 224 reaches conversion unit 226 and second separation unit 230, the quality and conversion of first separation unit exiting stream 224 to C$_4$+ hydrocarbon stream 232 may be improved.

Separation of hydrogen from quenched stream 218 may be accomplished in first separation unit 220 by using pressure swing adsorption, membranes, or cryogenic separation. Removing hydrogen in hydrogen stream 222 and thereby removing hydrogen from first separation unit exiting stream 224, which is the feed into conversion unit 226, provides more flexibility in the choice of a catalyst 238 and operating conditions. For example, removing hydrogen allows the use of metal based catalysts such as Ni-ZSM-5 in process 200, and more specifically, in conversion unit 226. Without hydrogen removal as explained above, the use of metal-based catalysts such as Ni-ZSM-5 would lead to hydrogenation of the ethylene produced in the thermal activation step being converted back into ethane. Removing hydrogen in hydrogen stream 222 also permits operation of conversion unit 226 under milder conditions of pressure and temperature which permits a corresponding reduction in capital and operating costs.

Figure 6:
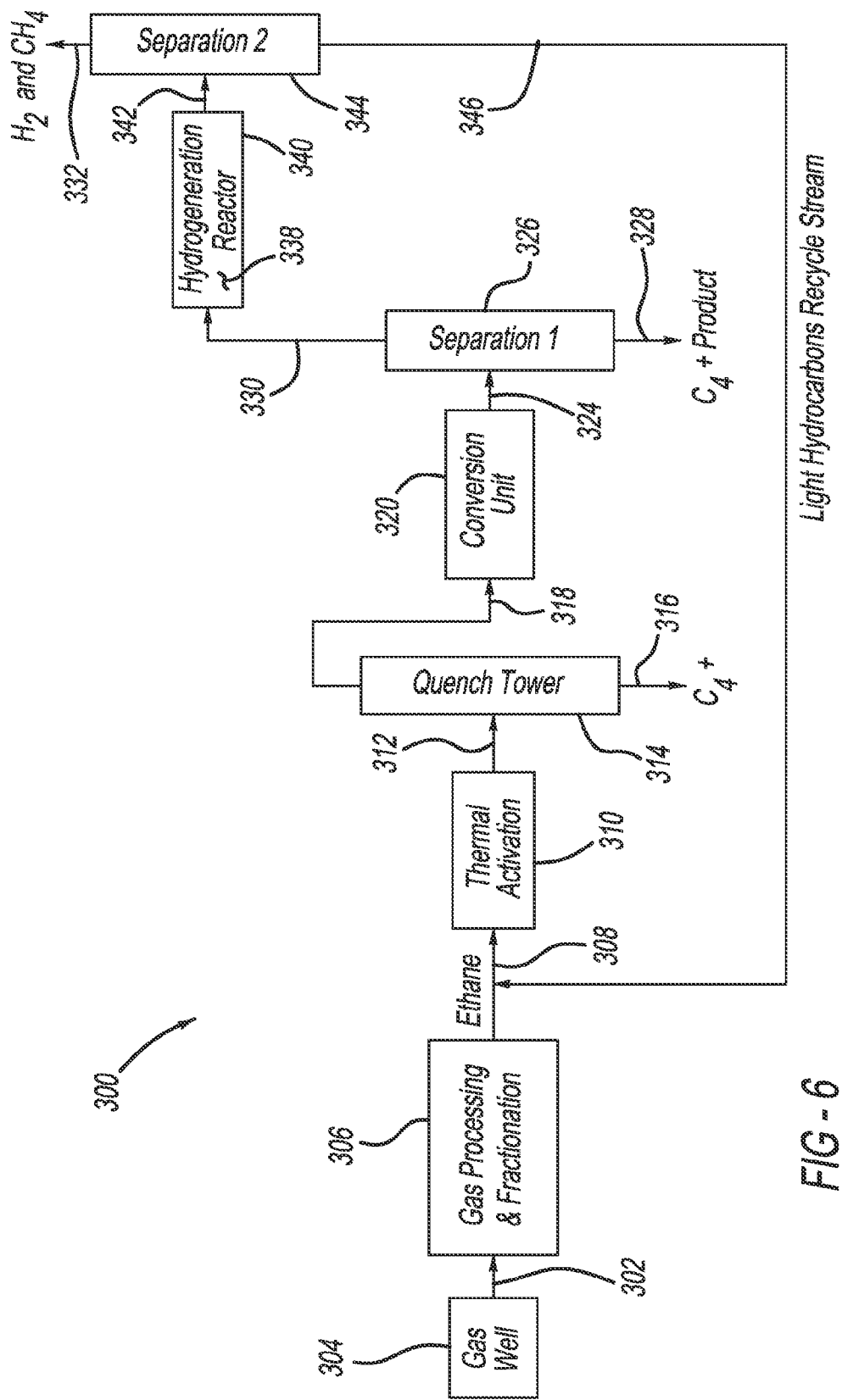
FIG. 6 is a schematic diagram depicting components used to convert ethane gas to liquid fuels.

Turning now to FIG. 6, a schematic diagram depicts components used in a process to convert ethane gas to liquid fuels 300. More specifically, an ethane stream 302 from a gas well 304, for example, may be directed directly from gas well 304 into a fractionator 306 for fractionation and associated gas processing. Upon undergoing fractionation in fractionator 306, a post-fractionator ethane stream 308 directly enters thermal activation unit 310 where heat is added to make the temperature of the ethane 500 degrees Celsius to 1000 degrees Celsius (inclusive). More specifically, ethane in post-fractionator ethane stream 308 is activated by heating to the temperature range of 500 degrees Celsius to 1000 degrees Celsius to produce an activated stream 312 that exits thermal activation unit 310. Activated stream 312 may be a gaseous product that includes hydrogen, methane, unconverted ethane, ethylene, acetylene, propane, propylene, acid gases, and other products. Activated stream may be a raw ethylene stream.

Activated stream 312 is directed directly from thermal activation unit 310 into a quench tower 314 to quench the activated stream 312. A hydrocarbon stream, which may be a $C_4+$ hydrocarbon stream 316, may exit quench tower 314. Also exiting quench tower 314 is a quenched stream 318 that is directed directly into a conversion unit 320 where oligomerization and cyclization occur. Quenched stream 318 that passes through conversion unit 320 becomes conversion unit exiting stream 324, which passes directly into first separation unit 326. First separation unit 326 separates conversion unit exiting stream 324 into two exiting streams, a $C_4+$ hydrocarbon stream 328 for hydrocarbon product fuels (e.g. gasoline and diesel), and a first separation unit exiting stream 330 that is directed directly into a hydrogenation reactor 340 that employs an internal catalyst 338, such as Ni based catalyst. Separation unit 326 may separate conversion unit exiting stream 324 into $C_4+$ stream 328 and first separation unit exiting stream 330.

Hydrogenation reactor 340 saturates the unconverted and produced olefins to paraffins so that they don't cause fouling in the thermal activation step. Upon exiting hydrogenation reactor 340, post-hydrogenation reactor stream 342 is directed directly into a separation unit 344 where, using separation technology, two exiting streams are formed. A first post-separation unit stream 332 may be a stream including $H_2$ and $CH_4$. A second stream may be a lighter product stream 346, which may be a $C_3$ and lighter (lower carbon) product stream, which may be directed directly back to post-fractionator ethane stream 308 so that it may be utilized as a recycle stream that is fed into thermal activation unit 310 to increase efficiency. There are multiple advantages to process to convert ethane gas to liquid fuels 300. In one advantageous step, thermal activation of ethane in thermal activation unit 310 produces a raw ethylene stream simply and easily. Another advantage is using raw ethylene in a conversion unit 320 to produce liquid fuels such as gasoline and diesel fuel because using raw ethylene results in lowering the costs of separating impurities from ethylene.

Figure 7:
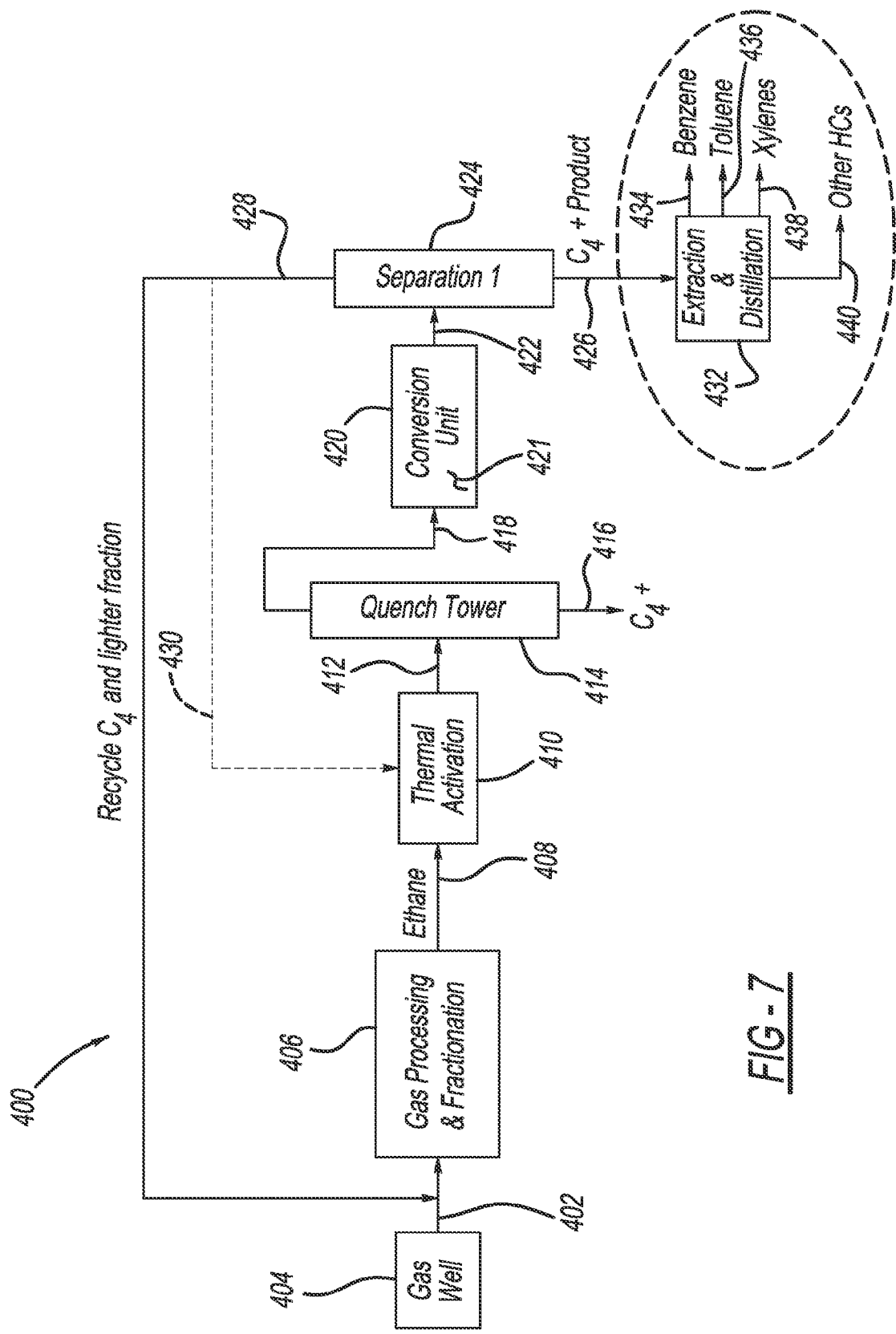
FIG. 7 is a schematic diagram depicting components used to convert ethane gas to liquid fuels.

FIG. 7 depicts components used in a flow process to convert ethane gas to chemicals 400. Turning to FIG. 7, a raw ethane stream 402 from a gas well 404, for example, may be directed directly from gas well 404 into a fractionator 406 for fractionation. Upon undergoing fractionation in fractionator 406, a post-fractionator ethane stream 408 directly enters thermal activation unit 410 where heat is added. More specifically, ethane in post-fractionator ethane stream 408 is activated at the temperature of 500 degrees Celsius to 1000 degrees Celsius (inclusive) to produce an activated stream 412 exiting thermal activation unit 410 consisting of hydrogen, methane, unconverted ethane, ethylene, acetylene, propane, propylene, acid gases, and other products. Activated stream 412 may be directed directly from thermal activation unit 410 into a quench tower 414 to quench activated stream 412. A hydrocarbon stream 416 may exit quench tower 414 and be a stream of $C_4+$ hydrocarbons. Also exiting quench tower 414 is a quenched stream 418 that is directed directly into a conversion unit 420 where a catalyst, such as zeolite (e.g. ZSM-5 zeolite), converts activated, quenched stream 418 to a mixed product stream 422 that exits conversion unit 420 and contains $C_1$-$C_{15}$ hydrocarbons and hydrogen. Mixed product stream 422 is directed directly into a separation unit 424 where it is separated into two streams, a $C_4+$ hydrocarbon stream, which may be a $C_4$-$C_{15}$ hydrocarbon stream 426 to be used as gasoline and diesel fuels, and a hydrogen ($H_2$) and $C_3$ and lighter fraction hydrocarbon stream 428, which may be a $C_1$-$C_3$ hydrocarbon stream and is also known as a light hydrocarbon stream.

There are two main utilization options for this light hydrocarbon stream 428. A first utilization option is depicted such that light hydrocarbon stream 428 is directed back in a recycle path to as a feed for fractionator 406 to ethane stream 402 just before fractionator 406. A second utilization option is depicted such that light hydrocarbon stream 428 is directed back in a recycle path 430 as a fuel gas in ethane thermal activation unit 410. In other words, as flow path 180 in FIG. 3 depicts, hydrogen ($H_2$) and $C_1$-$C_3$ hydrocarbons stream 178 is directed directly back into thermal activation unit 160.

With continued reference to FIG. 7, $C_4+$ hydrocarbon stream 426 which exits separation unit 424, may be directed into an extraction and distillation unit 432. Products such as benzene 434, toluene 436, xylenes 438 and other hydrocarbon products 440 exit from extraction and distillation unit 432 after processing within extraction and distillation unit 432. Within extraction and distillation unit 432, the stream is separated into Benzene, toluene, xylenes and other hydrocarbons.

Although extraction and distillation unit 432 has been described in conjunction with FIG. 7, extraction and distillation unit 432 could be coupled to any of the processes described above that produce a $C_4+$ hydrocarbon stream, such as a $C_4$-$C_{15}$ hydrocarbon stream, which may be used as the input stream for an extraction and distillation unit to produce chemicals, such as benzene, toluene, xylenes, and other hydrocarbon products.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for converting ethane comprising:
   directing a gaseous stream from a gas well into a fractionator;
   fractionating the gaseous stream to produce a post-fractionator ethane stream that comprises about 70 percent ethane;
   directing the post-fractionator ethane stream directly into a thermal activation unit;
   heating and raising the temperature of the post-fractionator ethane stream within the thermal activation unit and creating an activated ethane stream;
   directing the activated ethane stream into a quench tower to create a quenched stream comprising from 30 wt. percent to 80 wt. percent ethylene;
   directing the quenched stream into a conversion unit;
   utilizing a catalyst within the conversion unit to convert the quenched stream to a mixed product stream containing hydrogen and $C_1$-$C_{15}$ hydrocarbons; and
   directing the mixed product stream into a first separation unit to form a stream of $C_4$+ hydrocarbon product and a stream of $C_1$-$C_3$ hydrocarbons.

2. The process according to claim 1, further comprising: directing the stream of $C_1$-$C_3$ hydrocarbons into a hydrogenation reactor containing a catalyst to impart hydrogen into a post-hydrogenation reactor stream.

3. The process according to claim 2, further comprising: directing the post-hydrogenation reactor stream directly into a second separation unit and creating a light hydrocarbons recycle stream, and a hydrogen and methane stream.

4. The process according to claim 3, further comprising: recycling the light hydrocarbons recycle stream into the thermal activation unit.

5. A process for converting ethane comprising:
   directing a gaseous stream from a gas well into a fractionator;
   fractionating the gaseous stream to produce a post-fractionator ethane stream comprising about 70 vol. % ethane;
   directing the post-fractionator ethane stream directly into a thermal activation unit;
   heating and raising the temperature of the post-fractionator ethane stream within the thermal activation unit and creating an activated ethane stream;
   directing the activated ethane stream into a quench tower to produce a quenched stream comprising from 30 wt. percent to 80 wt. percent ethylene;
   discharging a first exiting quenched stream of $C_1$-$C_3$ hydrocarbons from the quench tower;
   discharging a second exiting quenched stream of $C_4$+ hydrocarbons from the quench tower;
   directing the first exiting quenched stream into a conversion unit;
   utilizing a catalyst within the conversion unit to convert the quenched stream to a mixed product stream containing hydrogen and $C_1$-$C_{15}$ hydrocarbons; and
   directing the mixed product stream into a separation unit;
   discharging a first exiting stream from the separation unit;
   discharging a second exiting stream from the separation unit; and
   directing the first exiting stream from the separation unit into an extraction and distillation unit.

6. The process according to claim 5, wherein the first exiting stream from the separation unit is a $C_4$+ hydrocarbon stream.

7. The process according to claim 6, wherein the first exiting stream from the separation unit is a first exiting $C_4$-$C_{15}$ hydrocarbon stream.

8. The process according to claim 7, further comprising: distilling and extracting a plurality of product streams from the first exiting $C_4$-$C_{15}$ hydrocarbon stream.

9. The process according to claim 8, wherein one of the product streams is benzene.

10. The process according to claim 8, wherein one of the product streams is toluene.

11. The process according to claim 8, wherein one of the product streams is xylene.

12. The process according to claim 5, further comprising: recycling the second exiting stream from the separation unit by directing it into the fractionator.

13. The process according to claim 5, further comprising: recycling the second exiting stream from the separation unit by directing it into the thermal activation unit.

14. The process according to claim 5, wherein the step of heating and raising the temperature of the post-fractionator ethane stream within the thermal activation unit and creating an activated ethane stream further comprises: producing an activated stream comprising hydrogen, methane, unconverted ethane, ethylene, acetylene, propane, propylene, and acid gases.

15. A process for converting ethane to liquid fuels comprising:
   directing a gaseous stream from a gas well into a fractionator;
   fractionating the gaseous stream to produce a post-fractionator ethane stream comprising about 70 vol. % ethane;
   directing the post-fractionator ethane stream directly into a thermal activation unit;
   heating and raising the temperature of the post-fractionator ethane stream within the thermal activation unit and creating an activated ethane stream;
   directing the activated ethane stream into a quench tower to create a quenched stream comprising from 30 wt. percent to 80 wt. percent ethylene;
   directing the quenched stream into a conversion unit;
   utilizing a catalyst within the conversion unit to convert the quenched stream to a mixed product stream containing hydrogen and $C_1$-$C_3$ hydrocarbons; and
   directing the mixed product stream into a separation unit to form a stream of hydrogen and $C_1$-$C_3$ hydrocarbons.

16. The process according to claim 15, further comprising: recycling the stream of $C_1$-$C_3$ hydrocarbons into the fractionator.

17. The process according to claim 15, further comprising: extracting $C_4$+ hydrocarbons from the quench tower.

18. The process according to claim 15, further comprising: extracting $C_4$-$C_{15}$ hydrocarbons from the separation unit.

19. The process according to claim 15, wherein the step of heating and raising the temperature of the post-fractionator ethane stream within the thermal activation unit and creating an activated ethane stream, further comprises: producing an activated stream comprising hydrogen, methane, unconverted ethane, ethylene, acetylene, propane, propylene and acid gases.

20. The process according to claim 5, further comprising directing the stream of $C_1$-$C_3$ hydrocarbons into a hydrogenation reactor containing a catalyst to impart hydrogen into a post-hydrogenation reactor stream, directing the post-hydrogenation reactor stream directly into a second separation unit and creating a light hydrocarbons recycle stream, a hydrogen and methane stream, and recycling the light hydrocarbons recycle stream into the thermal activation unit.

\* \* \* \* \*